United States Patent [19]

Pierschalla et al.

[11] 4,445,190
[45] Apr. 24, 1984

[54] PROGRAM IDENTIFICATION ENCODING

[75] Inventors: Barbara R. Pierschalla; Kenneth L. Jeffries; Kenneth M. Herrington; Robert F. Daugherty, all of Austin, Tex.

[73] Assignee: International Business Machines Corporation, Armonk, N.Y.

[21] Appl. No.: 274,353

[22] Filed: Jun. 16, 1981

[51] Int. Cl.³ .................... G06F 7/22; G06F 15/40
[52] U.S. Cl. ................................................ 364/900
[58] Field of Search ... 364/200 MS File, 900 MS File

[56] References Cited

U.S. PATENT DOCUMENTS

| | | | |
|---|---|---|---|
| 3,614,740 | 10/1971 | Delagi et al. | 364/200 |
| 3,643,226 | 2/1972 | Loizides et al. | 364/900 |
| 4,047,161 | 9/1977 | Davis | 364/200 |
| 4,118,788 | 10/1978 | Roberts | 364/900 |
| 4,152,762 | 5/1979 | Bird et al. | 364/200 |
| 4,257,096 | 3/1981 | McCullough et al. | 364/200 |
| 4,338,663 | 6/1982 | Strecker et al. | 364/200 |

*Primary Examiner*—Jerry Smith
*Assistant Examiner*—Mark P. Watson
*Attorney, Agent, or Firm*—Harold E. Meier

[57] ABSTRACT

A method for use in an electronic digital signal processing system for improving execution time in locating requested programs, reducing program storage requirements in memory and improving packaging and repackaging of programs on direct access memory devices for the library. A program data set for a system is formed to recognize the references to character program names and to resolve those references into control section identification codes. Each referenced character program name is uniquely encoded to a 16 bit control section identification code used as an input to a table lookup routine. The encoded control section identification for the program library loaded on the direct access memory consists of a data set number, a module index number and a control section number. A similar data structure is used to locate programs in storage by program management once they have been retrieved from the program library stored on a direct access memory device of the system.

6 Claims, 6 Drawing Figures

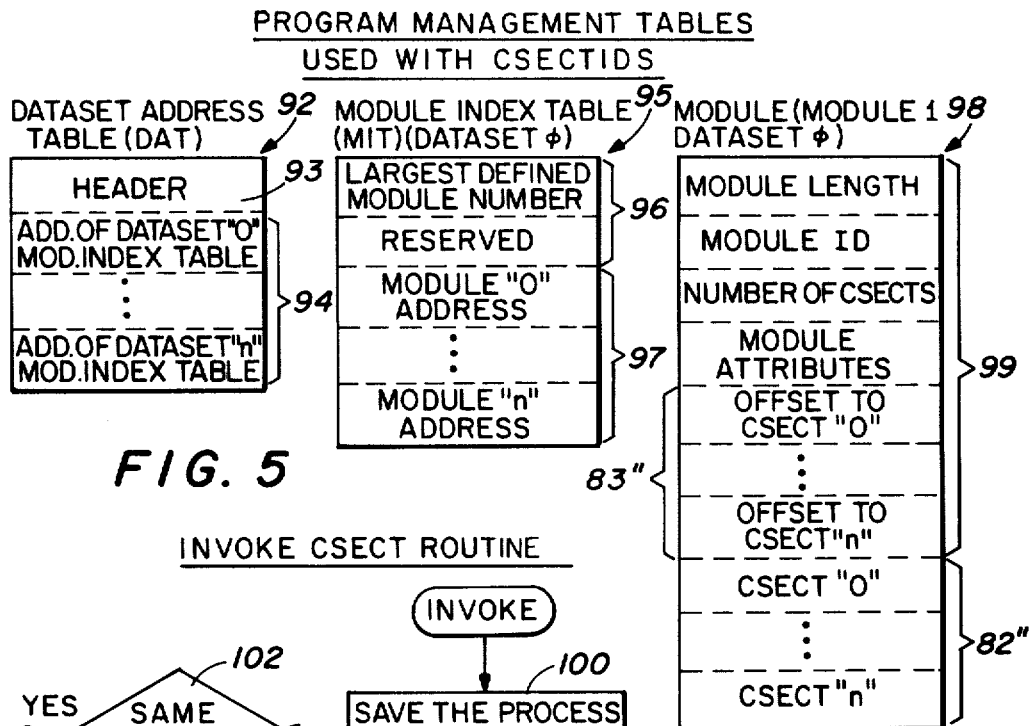
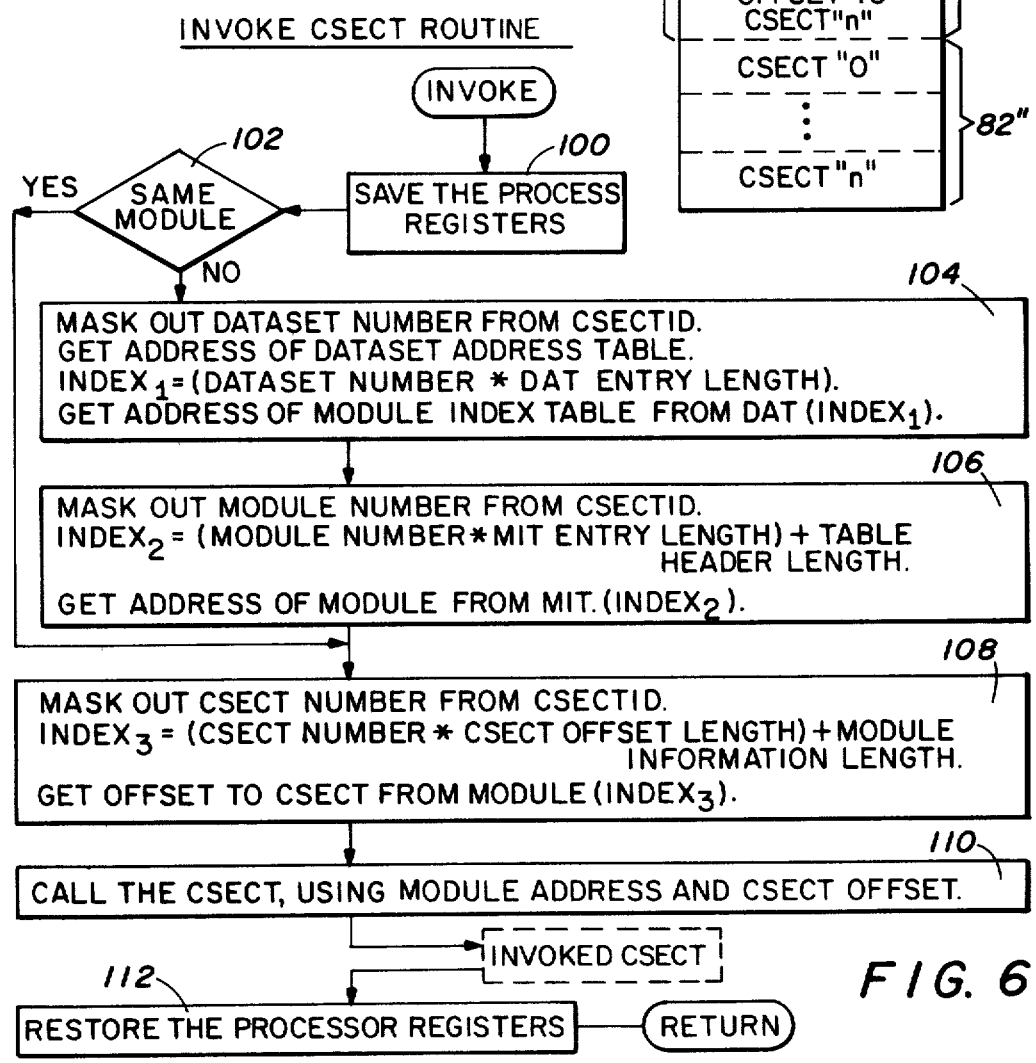

PROGRAM IDENTIFICATION ENCODING

BACKGROUND OF THE INVENTION

1. Field of the Invention

This invention relates to a system for packaging computer programs in a program data structure for storage and in a random access memory means for program management. In particular, it pertains to a method for encoding program names for use in a table indexing arrangement which uses the encoded program identification as an index into a set of tables to locate a referenced program.

2. Description of the Prior Art

Electronic digital signal processing systems have been previously developed to operate as word and data processing machines. A set of programs are packaged for storage in random access memory means for operation in the system's central processing unit. A set of program instructions for operation in the system are stored in direct memory access devices, such as tapes, disks, and diskettes, and connected by a memory bus to the processor and the random access memory means.

Individual programs permanently stored on the direct memory access device and loaded in the random access memory means of a word/data processing system must be uniquely identified for use in the system. Individual programs are typically identified by a one to eight character name which is then used as a search argument when CALLing, LOADing, and DELETE-ing the programs. In the environment of many word and data processing systems where there are frequent references to other programs and the set of programs is extensive, such prior art program identification methods become prohibitive in terms of the requirement of memory size to package the individual program identifications and the time of execution to use the character name as a search argument in locating the desired individual program. A need has thus arisen for a method of program identification which reduces the memory size requirements as well as the time of execution to locate a requested program.

SUMMARY OF THE INVENTION

The program identification method of the present invention reduces the memory size requirements as well as execution time in locating an individual program in a direct memory access device and a random access memory means. The improvement and the performance in the program storage requirements are achieved by replacing the storage of variable character names and the need for character comparison to locate the programs with an encoded control section identification which provides an index structure to locate the programs.

A one to eight character program name is encoded as a sixteen bit control section (CSECT) identification which is used as an index into a set of tables to locate a referenced program. The control section identification consists of a data set number, a module number and a CSECT number.

The program management routine within the system uses the data set number as an index into a data set table. Each entry in the data set table contains an address for the module table for a data set, if that data set contains one or more modules. The module number is then used as an index into a module table. Each entry in the module table contains the address of the module header for a module, if the module is LOADed. The CSECT number is used as an index into the module. Each entry in the module header contains the offset from the module header to a CSECT within that module, thereby eliminating a need for a more time consuming character comparison to locate the specified CSECT.

Program development is simplified for the program identification encoding method of the present invention by allowing programmers to develop source code using the character program names without any undue concern for the actual program packaging. The system's method for creating the program data set recognizes references to character program names and resolves these references into CSECT identifications. This mechanism allows programmers to develop the source code of a program using generic names to reference other programs without undue concern for the actual packaging, i.e., which data set contains which module and which module contains which CSECT. Program packaging may be changed by use of the present invention to improve storage use or program loading time without making changes to the source code of the programs.

BRIEF DESCRIPTION OF THE DRAWINGS

For a more complete understanding of the present invention and further objects and advantages thereof, reference is now made to the following Detailed Description taken in conjunction with the accompanying Drawings, in which:

FIG. 5 is an illustration of the program management tables used with CSECT identifications; and FIG. 6 is a flow chart diagram of a word/data processing system using the CSECT identifications for locating a uniquely identified program.

DETAILED DESCRIPTION

Figure 1:
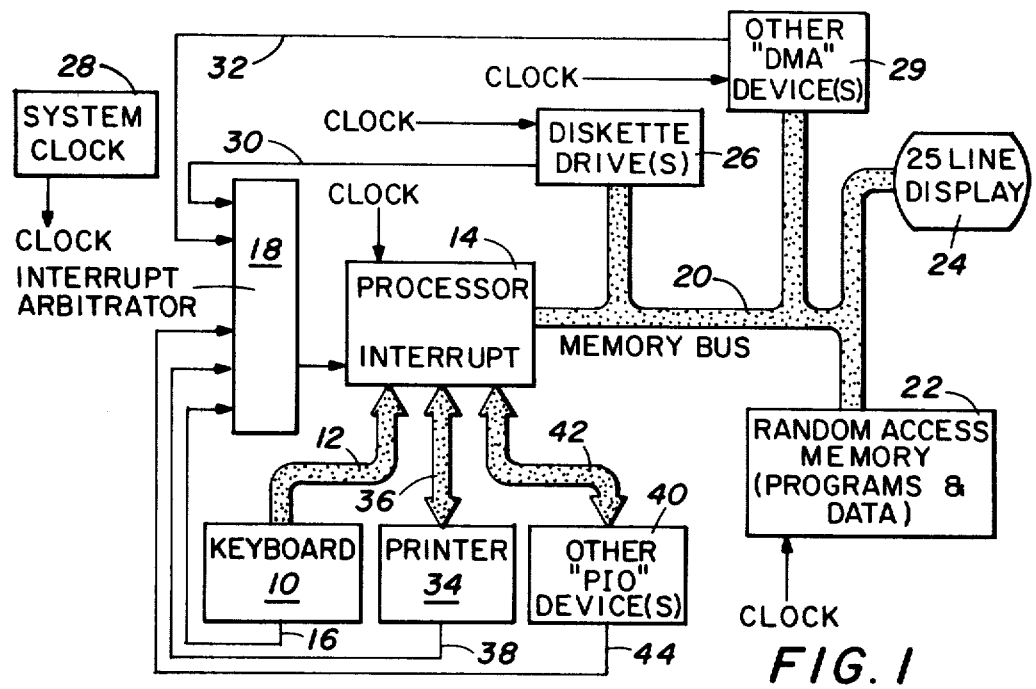
FIG. 1 is a block diagram of a word/data processing system for utilizing the present invention.

Referring to FIG. 1, a block diagram of a word and-/or data processing system implementing the present invention as illustrated. A keyboard 10 is provided for inputting graphic characters, data and instructions to the word and/or data processing system. The graphic characters, data and instructions from the keyboard 10 are applied through a data bus 12 to an electronic digital signal processor 14 of the system. The processor 14 may be implemented by a commercially available microprocessor, such as the Intel Corporation's 8086 processor. The Intel 8086 processor executes on one level with one set of registers.

Keyboard 10 also applies a hardware interrupt signal via interrupt line 16 to an interrupt arbitrator 18. The 8259-A Interrupt Controller was selected to implement the interrupt arbitrator 18 to resolve interrupt request from the incoming interrupt lines. The 8259-A Interrupt Controller may resolve interrupt requests from up to eight interrupt lines into eight priority levels for the 8086 processor 14.

The processor 14 performs the various control functions necessary for the word/data processing system to process, edit and display data. The processor 14 is connected by a memory bus 20 to a random access memory 22 for storing system data and programs. A visual display 24 is also connected by the memory bus 20 to the processor 14 for displaying data and information for enabling communication between the system and the operator of the system. A diskette drive 26 driven by the system clock 28 is also connected through the memory bus 20 to the processor 14. The diskette drive 26 comprises means for accessing the system programs that are stored in program libraries on diskettes. Modules from the program libraries may be loaded into the random access memory storage 22. The word processing system may include other direct memory access "DMA" devices 29 connected by the memory bus 20 to the processor 14. The diskette drives 26 and other "DMA" devices 29 provided hardware interrupt signals on interrupt lines 30 and 32, respectively, to the interrupt arbitrator 18.

A printer 34 communicates via an output data bus 36 with a processor 14 for providing a printed record of keyboard entered data or instructions from the system. The printer 34 provides another hardware interrupt signal via interrupt signal line 38 to the interrupt arbitrator 18. Other processor input/output devices 40 may also be provided as part of the system. The processor input/output devices 40 may communicate by an output data bus 42 to the processor 14 to provide a hardware interrupt signal by an interrupt signal line 44 to the interrupt arbitrator 18.

Figure 2:
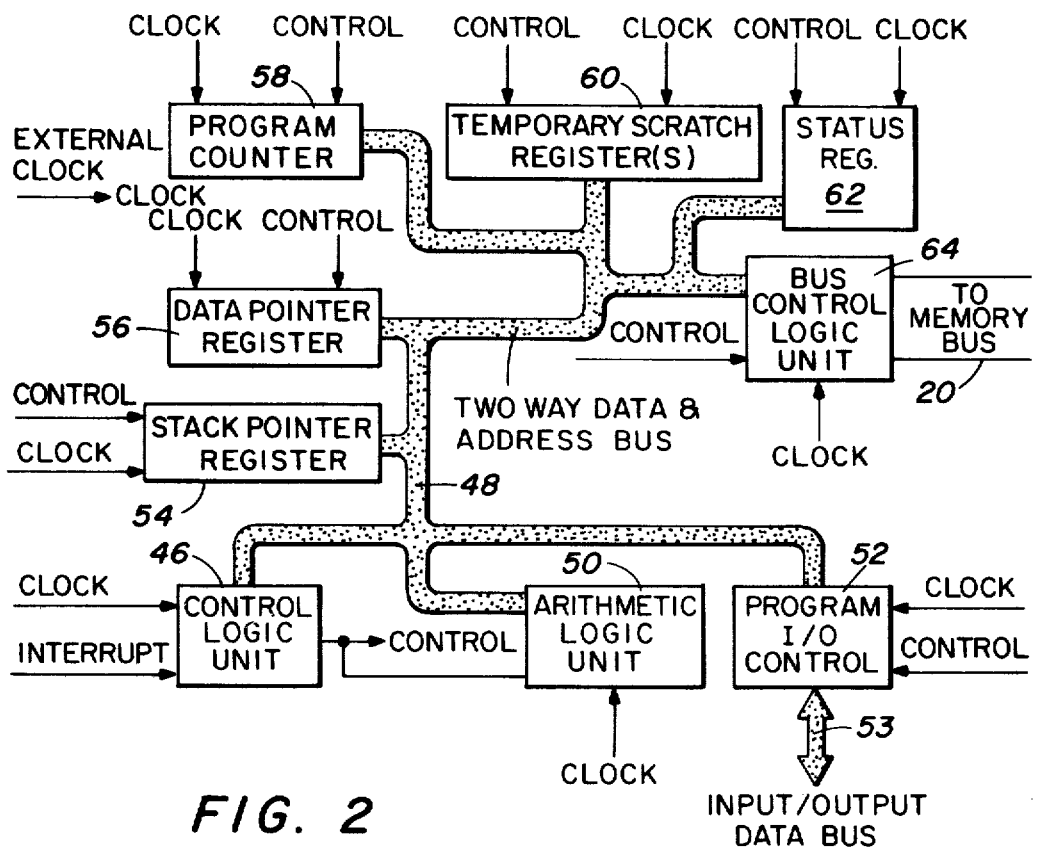
FIG. 2 is a block diagram of the processor of the word/data processing system illustrated in FIG. 1.

Referring now to FIG. 2, the processor 14 is illustrated in further detail to show the typical hardware elements found in such processors. The processor 14 includes a control logic unit 46 which receives priority interrupt signals from the interrupt arbitrator 18 of FIG. 1. The control logic unit 46 communicates via a two-way data and address bus 48 to the arithmetic logic unit 50, program I/O control 52, stack pointer register 54, data pointer register 56, program counter 58, temporary scratch register 60, status register 62, and bus control logic unit 64.

In response to a fetch instruction from the random access memory 22, the control logic unit 46 generates control signals to the other logic units of the processor, including the arithmetic logic unit 50, the program I/O control 52, the program counter 58, temporary scratch registers 60 and bus control logic unit 64. Data processed in the processor 14 is input through the bus control logic unit 64 and connected to the memory bus 20. A program I/O control unit 52 is connected to the input/output data bus 53. The bus control logic unit 64 connected to the memory bus 20 receives instructions for processing data to the input/output control 52. Synchronous operation of the control unit 46 with other logic elements of the processor 14 is achieved by means of clock pulses input to the processor from an external clock source. Different storage sections of the random access memory 22 are identifiable for instruction storage and data storage.

Processed data from the processor 14 is output through the program input/output control 52 to the input/output data bus 53. Input data on the data bus 48 is passed internally through the processor 14 to a control logic unit 46 by the arithmetic logic unit 50. The arithmetic logic unit 50, in response to a control signal from the control logic unit 46 and in accordance with instructions received on the memory bus 20, performs arithmetic computations which may be stored in the temporary scratch register 60. Other transfers of data between the arithmetic logic unit 50 and other logic elements of the processor 14 are possible. Such additional transfers may be to the program counter 58, the data pointer register 56 or the stack pointer register 54.

Also in a data stream for these various logic elements by means of the bus 48 is the status register 62. Operation of the processor 14 is determined by instructions of the memory bus 20 and input data on input data bus 12. For example, in response to received instructions the processor 14 may transfer data stored in the scratch register 60 to one of the registers 54, 56 or 62. Such operation of processors as detailed in FIG. 2 are well known to those in a data processing field. Thus, a more detailed description of each operation of the processor 14 is not necessary for a complete understanding of the invention as claimed.

Figure 3:
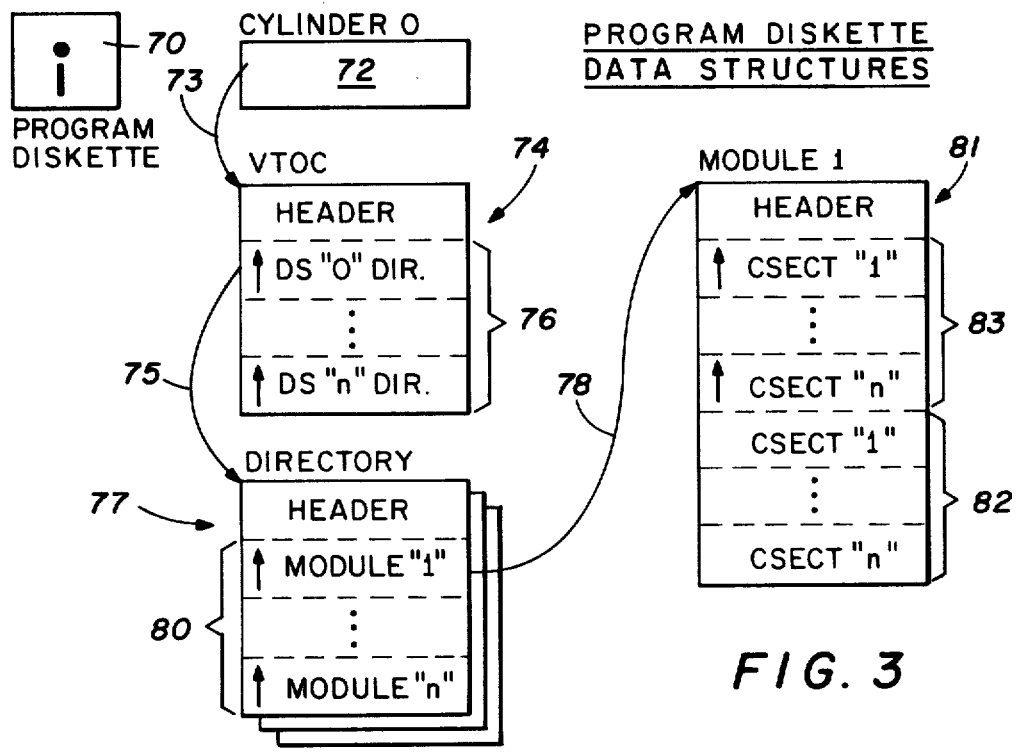
FIG. 3 is a block diagram illustration of the method of loading programs on a program diskette of a word-/data processing system.

Referring now to FIG. 3, a block diagram illustrates the format used to package programs on a program diskette 70 which is used by the diskette drive 26 of the system.

Cylinder "0" 72 is a predefined location on the program diskette 70 which contains a physical pointer 73 to a volume table of contents (VTOC) 74. This VTOC 74 in turn contains "n" number of physical pointers 75 for the "n" number of data set directory addresses 76. A data set directory 77 exists for each program data set defined. Each directory 77 contains a physical pointer 78 for each module address 80 contained in that data set directory 77. Each module 81 contains the CSECT offset 83 to locate the CSECT or program 82.

In the IBM Displaywriter word processing system incorporating the present invention, there exists one to sixteen program data sets 77, and each data set contains 1 to 127 programs modules 81. A module is defined to be the smallest entity that may be loaded from a diskette 70 by program management routines. Each module 81 contains 1-31 control sections (CSECTs) or programs 82. The CSECT identification 84 uniquely identifying each CSECT or program consists of the data set number, the module number and CSECT number. Part of the CSECT ID, the data set number, is used as an index into the VTOC to locate the required directory 77. Another part of the CSECT ID, the module number, is used as an index into the directory 77 to locate the required module 81. The CSECT number is then used as an index into the module header to locate the offset to the desired CSECT or program 82.

In a word/ data processing system an encoded CSECT identification 84 and a table lookup format are utilized so that the programs may be packaged or repackaged on the diskette 70 to reduce the amount of extra head movement required to read that program. With the encoded CSECT identification 84, a developed program can be reassigned by reassigning the module numbers, moving the modules from one data set to another to reduce the load time.

Figure 4:
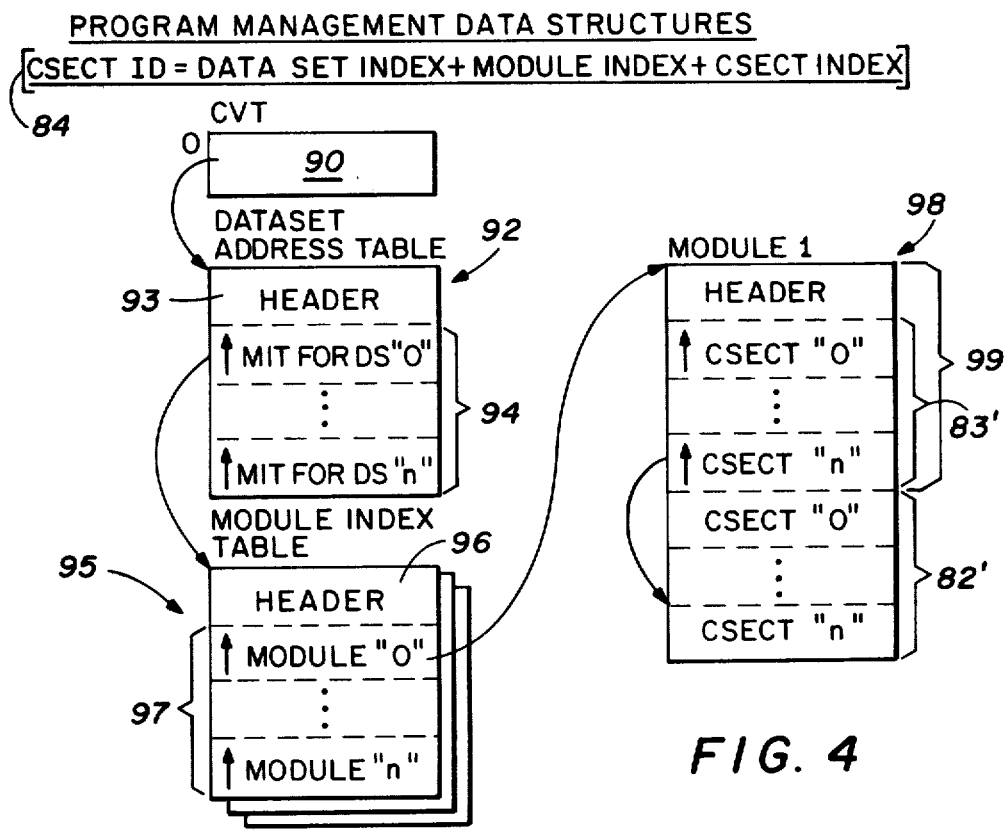
FIG. 4 is a block diagram of the method of storing programs in a program management data structure.

Referring now to FIG. 4, the program management data structures are illustrated for packaging the CSECTs or programs in random access memory 22 of the system once they have been loaded from the program library on the program diskette 70. A communication vector table 90 is a predefined location in the random access memory 22 containing the physical address of a data set address table (DSAT) 92. This DSAT 92 includes a header 93 and contains a physical module index table (MIT) address 94 of the one to "n" module index tables 95 for each of the data sets defined. Each module index table 95 contains a header 96 and a physical module address 97 of the one to "n" modules contained in the data set. If a module 98 has been loaded, then a module header 99 contains a physical CSECT offset 83' for each of the CSECTs or programs 82' in that module 98. The data set number forming part of the CSECT ID is used as an index into the data set address table 92 to locate the required module index table 95. The module number forming part of the CSECT ID, is used as an index into the module index table 95 to locate the required module 98. The CSECT number, forming part of the CSECT ID, is used as an index into the module 98 to locate the offset 83' to the requested CSECT or program 82'.

Referring now to FIG. 5, a block diagram is illustrated for the program management tables used with encoded CSECT identifications 84. The data set address table (DSAT) 92 consists of the addresses of the module index tables 95 for each of the data set "0"-"n". The module index table (MIT) 95 for only data set "0" is illustrated. The header 96 of the module index table 95 defines the largest number of modules defined in that data set. The module address 97 is the specific address location for each of the module numbers 1-"n". The specific module 98 for module 1, data set 0, is illustrated and includes a header 99 for identifying the module length, module identification, number of CSECTs within the module, and module attributes. The offset to the CSECTs numbers 1-"n" 83" are stored as part of the module followed by each of the CSECTs 1-"n" 82".

Referring now to FIG. 6, there is illustrated a flow chart diagram of the instructions for the routine to locate an individual CSECT or program 82. Following the invoking of the routine, instruction 100 is executed to cause the processor registers to be saved. The routine advances to the inquiry 102 to determine if the requested CSECT 82 is in the same module 98. If it is in the same module 98, the routine branches around instructions 104 and 106. If the requested CSECT 82 is in a different module 98, an instruction 104 is executed to mask out the data set number from the CSECT ID 84 to get the address of the module index table 95 from the data set address table 92. Instruction 106 is then completed to mask out the module number from the requested CSECT ID 84 to get the address of the module 98 from the module index table 95. The routine then advances to execute the instruction 108 to mask out the CSECT number from the requested CSECT ID 84, and to get the offset to the requested CSECT 82' from the module 98. The routine then executes instruction 110 to CALL the requested CSECT 82', using the module address 97 and CSECT offset 83' as identifications for the completion of the table lookup operation. Following the execution of the invoked CSECT, the routine executes the instruction 112 to restore the processor registers and returns control to the routine invoking the requested CSECT or routine.

The 1 to 8 character program name is digitally encoded for use in a table indexing routine, rather than use of the character program name in a search argument. In the program identification encoding as is used in the IBM Displaywriter system, the 1 to 8 character program name is encoded to a 16 bit (2 character) control section (CSECT) identification 84. Each CSECT 82 is assigned to a specific module 98. The relative position of a CSECT within a module 98 is defined to be the CSECT number. Each module 98 is assigned to a specific data set, and the relative position of the module 98 within a data set is defined to be the module number. A data set number defines the data set which contains the module 98 for the specified or requested CSECT 82'. The CSECT ID 84 is then derived from the combination of CSECT number, module number and data set number. In the IBM Displaywriter system, each bit of the CSECT ID is identified as follows:

XXXX XXX. ..... ..... - where XXXX XXX is the module number (1 to 127)

..... ..... Y Y YYY..... - where Y YYYY is the CSECT number (1 to 31)

..... ..... ..... ZZZZ - where ZZZZ is the data set number (0-15).

In the IBM Displaywriter system, the program data set is created by a linkage editor. The linkage editor is modified to recognize references to character program names and to resolve those references into CSECT IDs 84. This mechanism allows programmers to develop source code for the programs using generic names to reference other programs without undue concern for the actual packaging, i.e., to know which data sets contains which module or which module contains which CSECT.

Initially the program management routines use the data set number as an index for the data set table 92. Each entry in the data set table 92 contains the addresses 94 of the module index table 95 for a data set. The module number is used as an index in the module table 95. Each entry in the module index table 95 contains the address of the module 98, if LOADed. The CSECT number is used as an index into the module header 99. Each entry in the module header 99 contains the CSECT offset 83 of the CSECT 82 within that module. The system thus eliminates the need for costly character comparison to locate a specified CSECT 82.

Although the preferred embodiments of the invention have been illustrated in the accompanying Drawings and described in the foregoing Detailed Description, it will be understood that the invention is not limited to the preferred embodiment disclosed, but is capable of numerous rearrangements, modifications and substitution of parts and elements without departing from the spirit of the invention.

We claim:

1. A method of efficiently referencing individual programs of a program data set of an electronic signal processing system, comprising the steps of:

recognizing a character program name within a program;

encoding said character program name into a unique control section identification to identify said program, said control section identification formed by a combination of a control section number defining the relative position of a control section within a module, a module number defining the position of said module within the data set, and a data set number defining the data set which contains the module; and utilizing said control section identification as an index to locate the invoked control section in the program data set.

2. The method of efficiently referencing individual programs of claim 1, wherein said control sections of a program data set are stored in a direct access memory means of the system utilizing said encoded control section identifications to build a address table identifying the location of each of said control sections.

3. The method of efficiently referencing individual programs of claim 1 and further comprising the step of:
relocating said control sections in the direct access memory means by revising said encoded control section identification.

4. The method of efficiently referencing individual programs of claim 2 wherein said direct access memory means is a program diskette.

5. The method of efficiently referencing individual programs of claim 1, wherein said control sections of a program data set are stored in said memory means in locations defined by said encoded control section identification.

6. The method of efficiently referencing individual programs of a program data set of claim 5, wherein said memory means comprises a random access memory.

* * * * *